Nov. 10, 1970  J. P. KING, JR., ET AL  3,538,593
METHOD OF MAKING COMPOSITE STRUCTURE
Filed Dec. 13, 1965  2 Sheets-Sheet 2
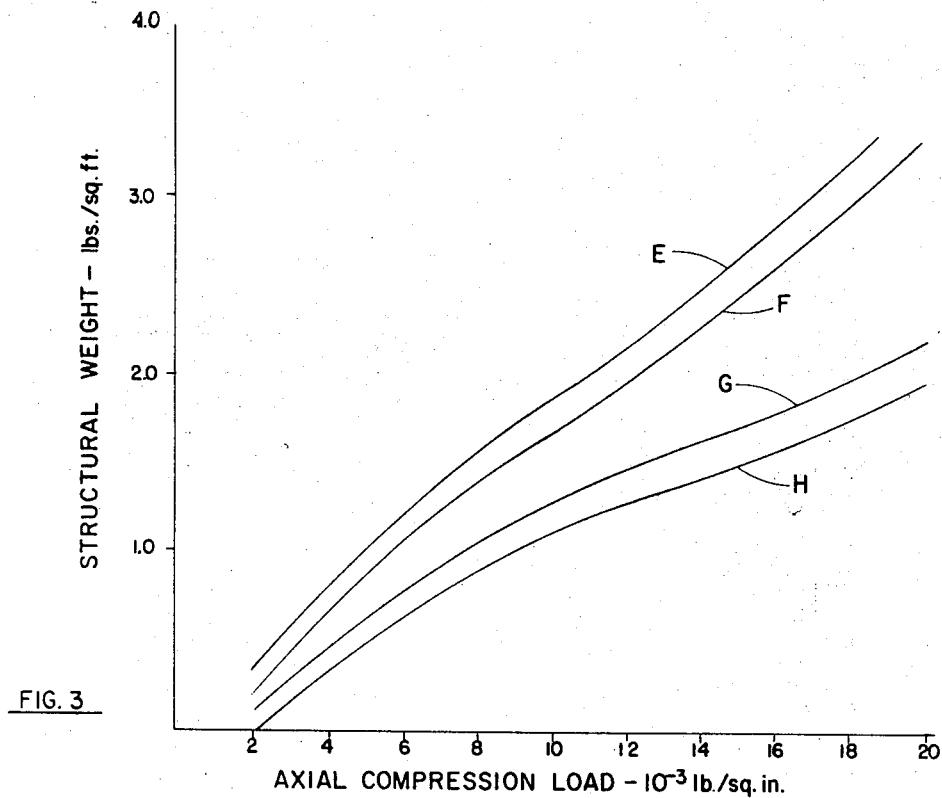
FIG. 3
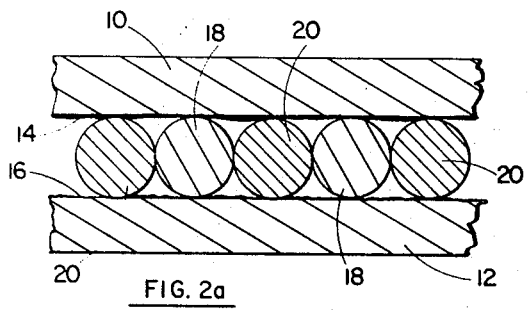
FIG. 2a  FIG. 2b
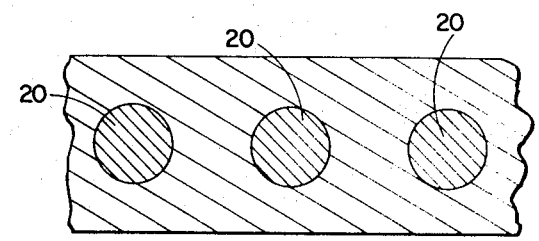
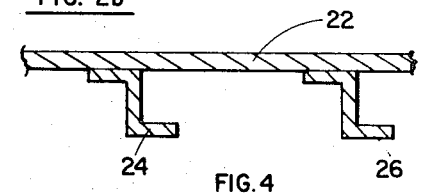
FIG. 4
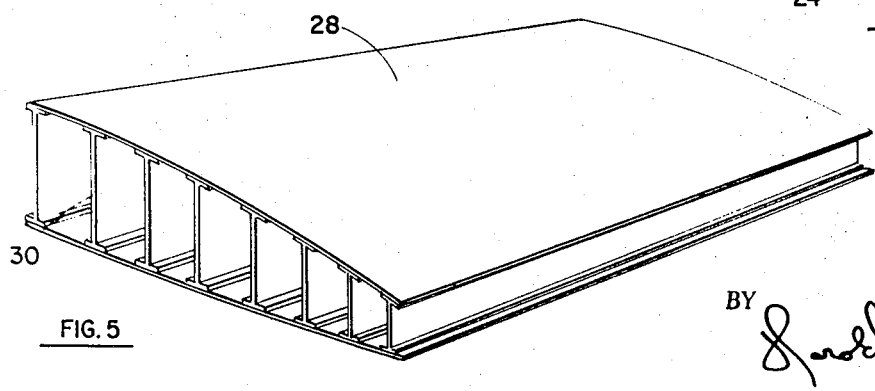
FIG. 5
INVENTORS
JULIAN P. KING, JR.
NORMAN KLIMMEK
PHILLIP A. BEESON
BY
ATTORNEY

United States Patent Office

3,538,593
Patented Nov. 10, 1970

3,538,593
METHOD OF MAKING COMPOSITE STRUCTURE
Julian P. King, Jr., Los Angeles, Norman Klimmek, Palos
  Verdes Estates, and Phillip A. Beeson, Woodland Hills,
  Calif., assignors to North American Rockwell Corpo-
  ration, a corporation of Delaware
       Filed Dec. 13, 1965, Ser. No. 513,247
              Int. Cl. B23k 31/02
U.S. Cl. 29—471.1                              8 Claims

ABSTRACT OF THE DISCLOSURE

In a process for joining two workpiece components by a solid state joint, the components are subjected to low compressive force and low temperature for a sufficient period of time to cause creep deformation of the surfaces sought to be joined. Precision machining of the surfaces is avoided, since plastic flow of the material achieves intimate contact therebetween as required for intermolecular exchange across the same, As applied to filamentary composites, the process avoids disarrangement or breakage of the delicate filaments.

---

Figure 1:
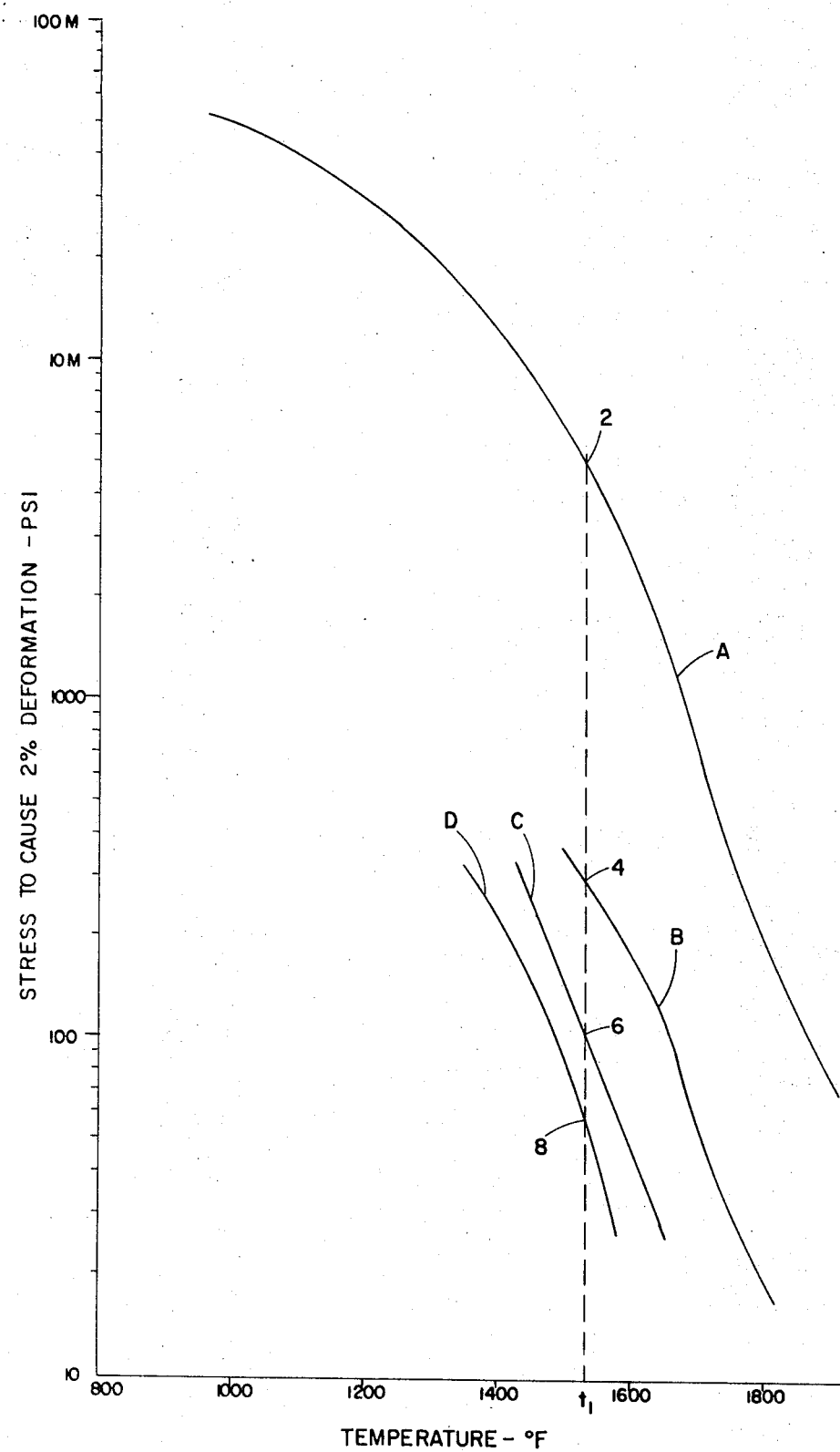

This invention relates to composite structures and their manufacture to provide reinforced construction elements for use in applications requiring high strength or stiffness without a commensurately high increase in weight and relatively low mass. More particularly, the invention contemplates improved method and material combination in the formation of composite elements such as sheets, slabs, or other various shapes characterized by toughness, temperature resistance, high strength, relative lightness of weight, and especially high modulus-weight ratios.

Although the invention is of wide applicability in forming a variety of different connections between elements of different forms and materials for diverse purposes, it will be described for the sake of illustration in connection with structural components adapted for use in high speed aerial or space vehicles. It will be understood that the scope of the inventive concept is in no sense limited by any of the specific details used to explain the invention, except as determined by reference to the accompanying claims.

The evolutionary development of design principles and technology in the manufacture of aerial and space vehicles has been accompanied by a constant search for new materials and structural expedients capable of resisting the increasing demands of load, temperature extremes and economy of weight in such vehicles. In addition to these considerations, materials proposed for such use are required to be readily available in quantity, to be compatible with normal manufacturing processes, and to be economically feasible with regard both to raw materials and fabrication methods required to mass produce articles therefrom. Of the various materials possessing inherent qualities of stiffness, strength and resistance to high temperature, it is a generally unavoidable fact of metallurgical life that materials having the highest properties of the stated type are the least ductile, the most difficult to deform or to cut, and otherwise of maximum inconvenience for usual mass-production and economic methods of manufacture. In some cases the materials are unusable in structural applications in their elemental or alloyed forms, e.g., boron.

Accordingly, in order to combine the advantages of good machineability and formability with maximum physical properties, the use of composite structures involving dissimilar materials or alloys has become generally more frequent and widespread throughout the aerospace industry. An example of such structures is the use of wires or filaments embedded in a matrix metal to form a reinforced composite sheet. In structures of the foregoing general type, the matrix comprises a very high proportion of the total workpiece mass, and a plurality of elongate rods or filaments are dispersed and embedded within the softer matrix to improve its physical integrity in various ways. Thus, the matrix material may be generally characterized by relatively low density, good mechanical properties or machineability and good corrosion resistance, whereas the filament materials may possess high strength and high modulus properties, stiffness, toughness and relatively poor machineability.

In the manufacture of composite materials of various types, essentially three kinds of processes have been used in the prior art. Although there are many modifications for each of the stated processes, they are essentially identifiable as liquid metal infiltration, powder metal compacting followed by sintering and the hot forging method.

The liquid metal infiltration techniques for consolidating metallic matrix and filament composites involves the preplacement of fibers in a desired pattern within a crucible or other appropriate containing means followed by vacuum or pressure casting of molten metal over the prearranged fibers. After cooling of the matrix, the composite element is usually subjected to forging, extrusion, rolling or the like, to improve its strength. The foregoing method has several disadvantages resulting especially from the high temperatures of molten metal involved which have deleterious effects on the metallurgical and physical properties of both the matrix and the filament in the final part. Moreover, the matrix is charatcerized by certain inherent deficiencies of cast metal such as granular separation and porosity due to shrinkage or gas evolution during cooling and consequent loss of strength in the final casting. In addition, close or accurate control of fiber placement and continuity is impossible in the practice of this method because the impact of molten metal upon the delicate, minute and unsupported filaments causes breakage and disarrangement thereof.

The powder metallurgical method for consolidating metallic matrix and reinforcing elements involves prearrangement of the filaments within a quantity of powdered matrix followed by compaction under high pressure and either simultaneous or subsequent sintering of the powdered metal and thereafter forging or rolling the workpiece to improve its density characteristics. Among the disadvantages of the foregoing method are the impossibility of controlling filament orientation during the compaction step, the breaking up of filaments due to high pressures involved, the low physical strength of the final composition due to characteristic porosity of sintered metals which prevents effective joinder between particles of the matrix or between the matrix and filament surfaces and the high cost and relatively short service life of production tooling capable of applying the necessary pressure to compact powdered metal.

The hot forging method has been used in the manufacture of composite sheets typically comprising a thin layer of metal cladding on the surface of another metal sheet or an interlayer sandwiched between two sheets. This method may typically involve prepalcement of assembled sheets within a die or retort which is evacuated or filled with inert gas and then placed in a high powered compressing machine such as a hydraulic press which may or may not incorporate high temperature heating means. Thereafter, very high pressure is applied for short periods at high temperatures to press together the assembled sheets and joint the same, as by forge welding. The disadvantages of the foregoing process include deleterious effects of high temperature such as recrystallization, residual heat stress and distortion in the materials, and in the case of steels, decarburization or granular size changes. Moreover, very high pressures are required to practice the foregoing method, inasmuch as the yield point of the workpiece material must be exceeded in order to cause flow of metal as required to force together faying surfaces. Such extreme working force severely comprises tool life and increases the overall cost related thereto. In addition, subsequent forging or other working of the part is necessary to increase its strength within a useful range of values.

Accordingly, it is a principal object of this invention to provide an improved method for diffusion bonding two materials in the solid state.

It is a further object to provide a method for the consolidation of metallic materix and filament composites in which the metallurgical and physical properties of both the matrix and filament materials are preserved throughout fabrication of the composites.

It is another object to provide an article of manufacture characterized by high modulus-to-weight ratios for use as a structural element.

It is another object of the invention disclosed herein to provide an improved method of consolidating a plurality of filaments in a metallic matrix characterized by close, continuous and accurate control of filament location and orientation throughout the consolidation process whereby the stated filaments are situated in a precise predetermined pattern in the finished workpiece.

It is another object in this case to provide a process as set forth in the above objects further characterized by ease and ecaonomy of manufacture, improved adaptability to mass-production methods, and avoidance of excessive tool wear.

Other objects and advantages will become apparent upon a close reading of the following detailed description of an illsutrative embodiment of the inventive concept, reference being had to the accompanying drawings, wherein:

FIG. 1 shows a typical family of curves showing creep deformation effects on a respresentive material comprising Ti–6A1–4V alloy, FIG. 2a shows a sectional view of workpiece components arranged to form the novel structure disclosed herein, FIG. 2b shows the structure of FIG. 2a after the inventive process is practiced thereon, FIG. 3 shows a comparison curve of certain physical characteristics of several workpiece materials including those formed according to the invention disclosed herein, FIG. 4 shows a cross-sectional view of a structural element of the general type upon which the calculated data of FIG. 3 is based, and FIG. 5 shows a general perspective view of an illustrative structural component in the manufacture of which the inventive principles of this case may advantageously be used.

The inventive article in this case contemplates and includes a workpiece assembly comprising two or more components joined together by solid state diffusion bonding. Where the two stated components consist, for example, of metallic sheets or slabs, it is a significant feature of the inventive method in this case that the creep deformation characteristics of the workpiece material, as determined by reference to empirical data, are used in determining the operative conditions for achieving an improved high strength joint between the bonded surfaces. The inventive article in this case further contemplates and includes a workpiece assembly comprising two or more sheets or slabs of metal or alloy material and having a plurality of elongate fibers or filaments between the faying surfaces thereof and permanently joined thereto. Flaments useful in the novel method disclosed herein may be metallic or nonmetallic, including crystalline or vitreous, and are embedded within the two stated matrix or face sheets to form an internally reinforced structural element useful in a wide range of construction applications.

It is further significant of this invention that a wide range of workpiece materials and forms thereof may be used either for the matrix or the filaments in practicing the novel method disclosed herein, and that the inherent metallurgical and physical properties of the stated materials existing before the joining process are preserved and maintained in the finished article. Thus, the inventive process disclosed herein successfully avoids certain severe operative factors such as elevated temperatures and excessive pressures, which would tend to produce numerous and diverse weakening or compromising effects in the finished part.

The matrix may illustratively comprise an alloy of aluminum with zinc, magnesium, titanium, vanadium, or other metals or alloys which exhibit such useful properties as relatively lesser density, good formability and machining characteristics at low tempeartures and good resistance to corrosion in comparison with other metals.

A number of low density, high modulus, high temperature refractory materials have been successfully used as filaments to form a composite article of the type disclosed herein. Included in such materials are graphite, metal oxides, carbides, borides, carbon and silicides. In general, these high temperature materials exhibit high strength, stiffness and high oxidation resistance, but very poor ductility and thermal shock resistance in comparison with metals. Metallic filaments usable in composites of the type contemplated herein may illustratively include pH 15–7 MO steel, beryllium, and various alloys of titanium, aluminum, silicon and boron.

Since the novel process disclosed herein involves solid state bonding of the composite materials, the maximum permissible temperature to which the material may be exposed during the bonding process never exceeds the melting point of either the matrix or the filament materials. Moreover, for reasons set forth in greater detail below, the workpiece temperatures used in practicing the novel method disclosed herein do not exceed the solidus of the matrix or the filament materials in combination. Because the harder, tougher and higher strength materials are normally used in the filaments, it is typically the solidus temperature of the matrix metal which determines the limiting point in any composite material combination. However, this temperature limitation compounds the difficulty of achieving an effective bond between the matrix and filament in most cases. For example, the maximum temperature for bonding of an aluminum matrix composite is about 1000 degrees F. because of adverse metallurgical heat treatment characteristics above that temperature. However, most refractory non-metallic filaments cannot react with aluminum at this low temperature to form a strong interphase solid state bond. Therefore, metallic filaments provide a higher probability of success in forming composite elements with an aluminum matrix exhibiting the foregoing limiting characteristics.

The inventive process may be practiced by situating in close mutual juxtaposition the plane or formed surfaces which are sought to be bonded together. With the workpiece components thus arranged, heat and pressure are applied in an amount and for a time period sufficient to hold the faying surfaces together and to permit that deformation of the faying surfaces which is characterized in the metallurgical art as creep deformation. The phenomena of creep deformation refers to the plastic flow of metal when held for long periods of time at stresses lower than the normal short-time yield strength and at temperatures considerably below their melting point. In the case of some metals and alloys, the temperature at which substantial creep deformation of the workpiece material occurs typically about one-half of the absolute melting temperature of the material.

Referring to FIG. 1 which shows a typical family of curves generally defining the relationship between stress and temperature in deforming an illustrative metallic material a given amount, curves A, B, C, and D each represent a period of time such as one-tenth hour, one hour, five hours, and ten hours, respectively. The dotted line at $t_1$ represents a given temperature, and shows that exposure of the workpiece to the temperature $t_1$ for a duration of one-tenth hour as identified with curve A and designated by reference numeral 2 thereon would require the application of very high stress in order to achieve the same amount of deformation as would result from exposing the workpiece to the same temperature for five hours as indicated by point 6 on curve C and requiring relatively much less stress. The point on curve A identified by reference numeral 2 is suggestive of a hot forging process such as discussed hereinabove, whereas point 8 on curve D for example, would logically be associated with the phenomena of creep deformation resulting primarily from temperature $t_1$ and involving substantially lower stress.

Certain significant and very considerable advantages result from the use of creep properties in the workpiece material in order to achieve a solid state bond of improved strength as discussed in greater detail below. One of the principal advantages is that faying surfaces which are sought to be diffusion bonded need not be carefully prepared by precision machining operations of sufficiently close tolerance as to make continuous uniform and intimate mutual contact between the surfaces necessary as in the conventional well-known processes of diffusion bonding.

Referring to FIG. 2a it may be seen that the inventive process in this case may illustratively be practiced to form a composite workpiece including a pair of matrix or face sheets 10 and 12 having faying surfaces 14 and 16 arranged in close juxtaposition and in generally parallel relationship with a plurality of filaments 18 arranged in substantially uni-directional, parallel and spaced-apart relationship as suggested by the cross-sectional view of FIG. 2a. Filaments 18 will advantageously be of different composition or material than matrix members 10 and 12. Moreover, additional fibers or filaments 20 of substantially the same size and form as elongate filaments 18 may advantageously be situated and interspersed between filaments 18 for a purpose discussed hereinbelow. It may be seen from the exaggerated showing of FIG. 2a that faying surfaces 14 and 16 may be characterized by microscopic roughness or unevenness such as identified with sheet metal as received from the rolling mill and need not be precision machined in order to achieve a perfectly flat or smooth contour. With the workpiece components arranged as suggested by FIG. 2a, and situated within an oxygen-free environment if necessary or desirable by use of a gas-filled retort or the like, a relatively low pressure such as 25 p.s.i. may be applied to compress together the assembled components with uniform and moderate firmness but without such force as might cause movement or fracture of delicate or brittle filaments 18 or 20. Simultaneously with the application of pressure, heat is applied to the assembled workpiece components in an amount sufficient to produce creep deformation in the confronting surfaces. Thus, heating is controlled and limited by programming the temperature and time duration in accordance with the inherent characteristics of the workpiece materials in each case, and in relation to the showing of FIG. 1 would roughly correspond to a relatively low stress and long duration such as associated with point 6 or point 8 on curves C or D, respectively. Moreover, the selection of materials and heating effects produced thereon will further be determined with continuous regard for the diffusion characteristics of such materials. Thus, creep deformation causes the faying surfaces to deform under the mutual pressure of contact whereby microscopic displacement of the workpiece material uniformly throughout such surfaces occurs as necessary to conform intimately and precisely with the contours of each other, as well as with the filaments 18 and 20. Simultaneously, and in association with the foregoing change due to creep deformation, atomic interchange of the material of each workpiece component results in diffusion of the material in each faying surface with those of the other such surface as well as with filaments 18 and 20, whereby all lines of contacts therebetween ultimately diminish or disappear. Accordingly, it may be seen that creep deformation of the workpiece material as necessary to achieve intimate contact between all faying surfaces must occur concurrently with atomic interchange at the interface boundaries thereof.

It is characteristic of the novel method disclosed herein that the protracted heating periods and extensive displacement of workpiece material in faying surfaces 14 and 16 which would otherwise be required to penetrate and fill completely the interstices between filaments 18 are avoided by the preplacement of filaments 20 which are the same composition as items 10 and 12 and which fill most of the voids or interstices between filaments 18 before the atomic interchange occurs. However, the use of creep deformation has been found to effectively consolidate fibers 18 and matrix members 10 and 12 with uniformly superior results without the use of filaments 20 although greater care and time is required in orienting filaments 18 and achieving a complete deffusion bond without filaments 20. After the completion of the bonding process as discussed above, the workpiece may be removed from the retort and cooled by any appropriate means. Thereafter, no further forging or heat-treating processes are required to improve the physical properties thereof.

Among the major advantages of the foregoing process, it will be understood that the avoidance of any liquid phase or elevated temperature effects during consolidation of the matrix and filament composite permits the use of continuous filament such as may extend from one extremity of an elongate workpiece to the other without interruption, and further permits such filaments to be accurately aligned and uniformly spaced prior to the bonding operation and maintained in the precise position of preplacement throughout the process. Moreover, no deleterious metallurgical changes such as degradation of the metal or alloy composition in the matrix or the filament materials result from the low pressure and temperature parameters involved in the inventive process. Thus, a complete and uniform bonded joint occurs between the filament and matrix over the entire interface therebetween but without excessive diffusion such as would alter the inherent identity of the filament material. As shown by FIG. 2b, for example, microscopic evaluation of the workpiece in cross section by conventional metallurgical techniques reveals a dim but very perceptible line of demarcation between the filament material and the surrounding matrix. As a result, the inherent physical properties of the filament material are unaffected by the process disclosed above. Also, the process is adaptable for use with conventional tooling and does not require costly machines with a capacity for tremendous pressures and temperatures. The final composite product is characterized by a significant and unexpected improvement in the structural integrity and physical properties of both the matrix and filament, and without the necessity for secondary processes to work the matrix material to improve its stiffness, strength or density.

Among the significant advantages obtained in the product resulting from the process discussed above, it may be seen from FIG. 3 that a valuable improvement in the modulus-weight ratio is obtained from the inventive concept disclosed herein. Thus, curves E, F, G, and H in FIG. 3 show a general comparison of data related to four test specimens of identical configuration and conforming in shape with the cross-sectional view shown in FIG. 4. Each of the specimens comprises a substantially flat sheet or slab 22 having secured to one side thereof a plurality of reinforcing or stiffening members 24 and 26 which may illustratively take the form shown. The specimen to which curve E of FIG. 3 relates consists of a heterogeneous 8-1-1 titanium alloy having the approximate composition of 8 percent aluminum, 1 percent molybdenum, 1 percent vanadium, and the balance essentially titanium for both members 24 and 26 and face sheet or panel 22. Curve F of FIG. 3 relates to a specimen in which panel 22 had the same heterogeneous composition as described above regarding Curve E, but stiffening members 24 and 26 are reinforced by the addition of 30 percent by volume of boron filaments in a matrix corresponding with the stated titanium alloy. Curve G of FIG. 3 relates to a specimen having panel 22 reinforced by 30 percent by volume of boron filaments in a matrix corresponding to the stated titanium alloy, while stiffening members 24 and 26 comprised a heterogeneous mass of the same alloy. Curve H in FIG. 3 relates to a specimen in which all of the component parts 22, 24 and 26 are reinforced with the same volume of boron filaments in the same matrix and diffusion bonded in the same way, corresponding with the structure and procedure described above in regard to FIGS. 2a and 2b. It may be seen from FIG. 3 that an axial compression load of 10,000 pounds per inch of the stated specimens can be resisted by reinforced specimens related to Curve H and having much less total weight than those resulting from Curves E, F and G.

A further illustration of the improvement in physical properties resulting from use of the composite structure shown in FIGS. 2a and 2b may be seen in connection with a typical wing box such as shown in FIG. 5. It has been found that a wing box of the general type shown in FIG. 5 and comprising a very highly stressed component in aircraft, when fabricated from an alloy of 7075 aluminum for both the outer skin 28 and internal supporting structure 30 outweighs by more than one-third the same structure when fabricated from the titanium alloy discussed above reinforced by boron filaments.

We claim:
1. In a method of consolidating a matrix with a plurality of filaments to form a composite article, the steps of:
supporting a plurality of preplaced filaments on a surface of a first metallic sheet,
covering said surface and said filaments thereon with a second metallic sheet, and,
applying sufficient heat to said first and second sheets to induce creep deformation of the metal in said first and second sheets, and to form a solid state diffusion bond between said sheets and said filaments, said temperature being less than the solidus of said sheets.
2. The process set forth in claim 1 above, including in addition thereto:
applying a relatively low pressure to said first and second sheets tending to compress said filaments therebetween.

3. The process set forth in claim 2 above, wherein:
at least some of said filaments are dissimilar in composition from said first and second sheets, but capable of diffusion bonding therewith, and
said heat and pressure are sufficient in amount and duration to cause said diffusion bonding.
4. The process set forth in claim 1 above, wherein:
said filaments include a first group having substantially the same composition as said first metallic sheet, and
said filaments further include a second group having a composition substantially differing from that of said first metallic sheet.
5. The process set forth in claim 4 above, wherein:
said filaments in said first group are preplaced in spaced-apart and substantially parallel relationship, and
one of said filaments in said second group is preplaced in said space between each of said spaced-apart filaments in said first group.
6. The process set forth in claim 5 above, including in addition thereto:
maintaining said heat for a sufficient time to cause said creep deformation in said first and second sheets to displace the material thereof into close and intimate contact with each other and with said filaments.
7. The process set forth in claim 6 above, including in addition thereto:
applying sufficient heat and pressure to cause diffusion bonding between said filaments and said first and second sheets.
8. In a method of bonding together two faying surfaces of metallic alloy material, the steps of:
placing said faying surfaces in contacting relationship,
applying sufficient heat to said surfaces to induce creep deformation of said material, and
applying compressive force to hold said surfaces in said contacting relationship with sufficient pressure during said application of heat to cause diffusion bonding of said surfaces to each other.

References Cited
UNITED STATES PATENTS

| | | | |
|---|---|---|---|
| 2,169,937 | 8/1939 | Wempe. | |
| 2,421,607 | 6/1947 | Fowler | 29—502 X |
| 3,144,370 | 8/1964 | Bennett et al. | 29—472.9 |
| 3,153,581 | 10/1964 | Hutchins. | |
| 3,201,862 | 8/1965 | Gotoh | 29—497.5 X |
| 3,371,407 | 3/1968 | Forsyth et al. | 29—498 X |
| 3,372,470 | 3/1968 | Bindari | 29—470.1 X |

JOHN F. CAMPBELL, Primary Examiner

R. J. SHORE, Assistant Examiner

U.S. Cl. X.R.
29—471.3, 497.5